US012621510B2

(12) United States Patent
Lee et al.

(10) Patent No.: US 12,621,510 B2
(45) Date of Patent: *May 5, 2026

(54) PLATFORM SYSTEM AND METHOD FOR TRANSMITTING VIDEO IN REAL TIME WITH ULTRA-LOW LATENCY

(71) Applicant: QUOPIN CO., LTD., Seongnam-si (KR)

(72) Inventors: Sang Hoon Lee, Seongnam-si (KR); Hack Kyung Kim, Incheon (KR); Soo Hyun Park, Ansan-si (KR)

(73) Assignee: QUOPIN CO., LTD., Seongnam-si (KR)

( * ) Notice: Subject to any disclaimer, the term of this patent is extended or adjusted under 35 U.S.C. 154(b) by 188 days.

This patent is subject to a terminal disclaimer.

(21) Appl. No.: 18/519,109

(22) Filed: Nov. 27, 2023

(65) Prior Publication Data

US 2024/0137586 A1    Apr. 25, 2024
US 2024/0236386 A9    Jul. 11, 2024

Related U.S. Application Data

(63) Continuation of application No. PCT/KR2022/006956, filed on May 16, 2022.

(30) Foreign Application Priority Data

May 28, 2021    (KR) ........................ 10-2021-0069292

(51) Int. Cl.
*H04N 21/2662*    (2011.01)
*H04L 1/18*    (2023.01)
(Continued)

(52) U.S. Cl.
CPC ....... *H04N 21/2343* (2013.01); *H04L 67/104* (2013.01); *H04N 21/6405* (2013.01)

(58) Field of Classification Search
CPC ........... H04N 21/2343; H04N 21/6405; H04N 21/2662; H04L 67/104; H04L 1/18
See application file for complete search history.

(56) References Cited

U.S. PATENT DOCUMENTS

| | | | | |
|---|---|---|---|---|
| 10,701,370 | B2 * | 6/2020 | Sze | ................. H04N 21/23406 |
| 2006/0272028 | A1 * | 11/2006 | Maes | ............... H04N 21/25435 |
| | | | | 726/28 |

(Continued)

FOREIGN PATENT DOCUMENTS

| | | |
|---|---|---|
| KR | 20120108942 A | 10/2012 |
| KR | 20160140012 A | 12/2016 |

(Continued)

*Primary Examiner* — Glenford J Madamba
*Assistant Examiner* — Hassan Abdur-Rahman Khan
(74) *Attorney, Agent, or Firm* — NKL Law; Jae Youn Kim

(57) ABSTRACT

Provided is a platform system for transmitting a video in real time with ultra-low latency, the platform system including: a caster unit configured to encode and transmit a video signal provided from one or a plurality of video sources through a network communication network; a platform server configured to provide the video signal transmitted from the caster unit in a streaming manner; and a user terminal configured to be provided with the video signal from the platform server in a streaming manner.

The platform system and method for transmitting a video in real time with ultra-low latency according to the present disclosure has the advantage that it is possible to provide an ultra-low latency service anytime anywhere as long as the internet is connected by enabling real-time transmission of an end-to-end video signal.

15 Claims, 4 Drawing Sheets

(51) Int. Cl.
   *H04L 67/104*      (2022.01)
   *H04N 21/2343*    (2011.01)
   *H04N 21/6405*    (2011.01)

(56)                      References Cited

U.S. PATENT DOCUMENTS

| | | | |
|---|---|---|---|
| 2013/0042015 A1* | 2/2013 | Begen ................... | H04N 19/154 |
| | | | 709/231 |
| 2015/0264096 A1* | 9/2015 | Swaminathan ....... | H04L 65/612 |
| | | | 709/219 |
| 2016/0381397 A1* | 12/2016 | Krahnstoever .... | H04N 21/2183 |
| | | | 725/146 |
| 2020/0206618 A1* | 7/2020 | Perlman ............... | H04N 19/146 |
| 2021/0099739 A1* | 4/2021 | Weil ................. | H04N 21/23439 |
| 2024/0137586 A1* | 4/2024 | Lee ........................ | H04N 21/63 |

FOREIGN PATENT DOCUMENTS

| | | |
|---|---|---|
| KR | 101821145 B1 | 1/2018 |
| KR | 20200112405 A | 10/2020 |

* cited by examiner

PLATFORM SYSTEM AND METHOD FOR TRANSMITTING VIDEO IN REAL TIME WITH ULTRA-LOW LATENCY

TECHNICAL FIELD

The present disclosure relates to a platform system and method for transmitting an end-to-end video in real time under the environment of a wired/wireless internet network. In more detail, the present disclosure relates to a platform system and method for transmitting a video, that platform system and method being able to provide an ultra-low latency service anytime anywhere as long as the internet is connected by transmitting a video in real time through mobile or wired internet network communication.

BACKGROUND ART

With the full-fledged advent of the era of 5th generation (5G) mobile communication service that is the centerpiece of 4th industrial revolution, the 5G mobile communication is being applied to almost all fields including Virtual Reality (VR), Autonomous driving (AD), and Internet of Things (IoT).

5G that enables 4th industrial revolution is a mobile communication technology, which uses UHF of 28 GHz and shows a maximum download speed of up to 20 Gbs, has 'ultra-high speed', 'hyper-connectivity', and 'ultra-low latency' as principal characteristics.

'Hyper-connectivity' means that as the information communication technology makes a deep inroad into everyday life, all things are closely connected with human life like a spider's web and 'ultra-low latency' means that the end-to-end video transmission time is a level under several tens of microseconds in machine type communication.

However, whether 'ultra-low latency' that is one of the principal characteristics of 5G mobile communication is implemented depends on the network configuration for maintaining the end-to-end video transmission time of machine type communication almost at real time (RT).

However, video transmission platforms (or systems) of the related art serve only to simply relay end-to-end video transmission through buffering, so they have a problem that delay frequency occurs and accordingly videos are not transmitted/received in real time.

DISCLOSURE

Technical Problem

Accordingly, the present disclosure has been made in an effort to solve the problems of such video transmission platforms (or systems) of the related art and an objective of the present disclosure is to prevent disconnection due to delay and enable videos to be transmitted/received in real time by enabling end-to-end videos to be transmitted with ultra-low latency.

However, objectives of the present disclosure are not limited to those described above and other objectives not stated would be clearly understood from the following description by those skilled in the art.

Technical Solution

A platform system for transmitting a video in real time with ultra-low latency according to an embodiment of the present disclosure includes: a caster unit (100) configured to encode and transmits a video signal provided from one or a plurality of video sources (110) through a communication network; a platform server (200) configured to provide the video signal transmitted from the caster unit (100) in a streaming manner; and a user terminal (300) configured to be provided with the video signal from the platform server (200) in a streaming manner, The caster unit includes: one or a plurality of video sources (110) such as a camera, a computer, a set-top box, a PC, etc.; an encoder (120) configured to encode the video signal provided from the video source (110); and a caster (130) configured to transmit the video signal encoded by the encoder (120) to the platform server (200) through a network communication network or transmit the video signal directly to the user terminal (300).

In this case, the even though the video signal is input as not a full frame, but a partial frame (sub-frame) of sub-slice type, the encoder (120) may immediately encode and transmit the video signal to the caster (130).

Further, the encoder (120) is equipped with a high-speed encoder having real-time encoding performance, is linked with the user terminal (300), and is enabled to encode and transmit a next video signal with reference to feedback information about a reception state of a video signal received from the user terminal in real time, thereby being able to reduce end-to-end delay.

In this configuration, the feedback information may include at least any one of network communication network state information, an available bandwidth of data, a data loss rate, a video quality, and whether there is disconnection.

Further, the encoder (120) may be provided for each video source (110) to independently perform an encoding function.

Meanwhile, the platform server (200) may function as a streaming device relaying a video signal between the encoder (120) and the user terminal (300) and connecting transmission and reception of between the caster (130) and the user terminal (300), may perform a function of managing an encoder (120) accessed through the caster (130), and may perform a multimedia transcoding function too.

The platform server 200 calculates a charge on a user account (30) in linkage with the user terminal (300), registers one or a plurality of casters (130) as agents, and imposes charges on users who see the video source (110) of an encoder (120) connected thereto on the basis of a subscription plan, use time, etc.

The platform server (200) manages connection (session establishment and release, monitoring, etc.) between the encoder (120) and the user terminal (300).

Meanwhile, the caster (130) manages one or a plurality of encoders (120) connected to itself. The caster (130) can directly transmit the video signal encoded by the encoder (120) to the user terminal (300) through a network communication network in a Peer-to-Peer (P2P) manner, or can transmit the video signal to the platform server (200) in a relay stream manner, or can select any one of the two manners as a path.

When selecting the transmission paths, it is possible to primarily attempt the P2P direct transmission manner for a video signal stream request from a user accessing the video source (110) and secondarily perform relay transmission through the platform server (200) when transmission by a network communication network is not smooth.

The caster (130) may transmit and store video signal streams to a storage server (400) connected to a network other than video signal stream transmission.

Further, user charging according to an embodiment of the present disclosure includes a manager account (10), an operation account (20), and a user account (30).

The operator has a right to register the caster (130), the encoder (120), and the user account (30) and connect the user account (30) to the encoder (120). The operation may be granted a right from the manager and may register, delete, and release a caster, an encoder, and a user on and from the platform server (200).

The user may see only the video source (110) connected to the encoder (120) connected by the operator.

The manager has a right to manage the platform system (200) and register, delete, and cancel an operator, a caster, an encoder, and a user on and from the platform.

Meanwhile, a method for transmitting a video in real time with ultra-low latency according to an embodiment of the present disclosure includes: encoding and transmitting a video signal provided from one or each of a plurality of video sources (110) to a caster (130) by means of an encoder (120); transmitting a video signal encoded by one or a plurality of encoders (120) to a platform server (200) through the network communication network by means of the caster (130); and relay-streaming the video signal transmitted from the caster (130) to a user terminal (300) by means of the platform server (200).

The encoding includes encoding and transmitting the video signal to the caster (130) even though the video signal is input as not a full frame, but a partial frame (sub-frame) of sub-slice type from the video source (110).

The encoding may include adjusting encoding parameter values with reference to feedback information about a reception state of a video signal received from the user terminal (300) in real time and encoding and transmitting a next video signal to the cater (130) by means of the encoder (120) linked with the user terminal (300).

The feedback information may include at least one of network communication network state information, an available bandwidth of data, a data loss rate, a video quality, and whether there is disconnection; and the parameter values may include any one of a compression quantum value, a bitrate, a size of a sub-frame to be encoded, a frame per second (fps), multicast, and a value of a group of pictures (GoP).

The method may further include providing the encoder (120) for each video source to perform an individual function for each video source (110).

The transmitting through a network communication network may further include transmitting the video signal in a Peer-to-Peer (P2P) manner directly to the user terminal (300), transmitting the video signal in a stream relay manner to the platform server (200), or selecting any one of the two manners as a path.

When selecting the transmission paths, it is possible to primarily attempt the P2P direct transmission manner for a video signal stream request from a user accessing the video source (110) and secondarily perform stream relay transmission through the platform server (200) when transmission by a network communication network is not smooth.

The method may further include performing a charging function on a user and collecting charging information based on use time and plan from a user by means of the platform server (200) in linkage with the user terminal (300).

Further, the method may further include registering one or a plurality of casters (130) as agents and charging on the basis of use time and a subscription plan of a user accessing and seeing a video source (110) connected to the caster.

The method may further include charging in accordance with the number when one caster (130) connects and manages a plurality of encoders 120.

Advantageous Effects

According to the configuration described above, the present disclosure has the following effects.

First, according to the platform system and method for transmitting a video in real time with ultra-low latency of the present disclosure, each video source (110) is equipped with a high-speed encoder that can perform encoding in real time to be able to immediately encode and transmit a video signal to a caster (130) even though the video signal is input as not a full frame, but a partial frame (sub-frame) of sub-slice type, whereby there is the advantage that it is possible to transmit an end-to-end video with ultra-low latency.

Second, according to the platform system and method for transmitting an a video in real time with ultra-low latency of the present disclosure, an encoder (120) is linked with a user terminal (300) in real time and, can adjust encoding parameter values with reference to feedback information about the reception state of a video signal received in real time from the user terminal and can encode and transmit the next video signal in real time. Accordingly, there is no need for a specific procedure for managing and controlling QoS of a video, so it is possible to transmit an end-to-end video with ultra-low latency.

Third, according to the platform system and method for transmitting a video in real time with ultra-low latency of the present disclosure, since it is possible to transmit a video with ultra-low latency, the present disclosure has the advantage that it can be applied to various fields of 4th industry such as autonomous driving, unmanned drone operation, driving of unmanned heavy equipment, robot control, a remote medical service, VR·AR, an intelligent CCTV, a smart city·factory, provision of traffic information, etc.

MODE FOR INVENTION

Figure 1:
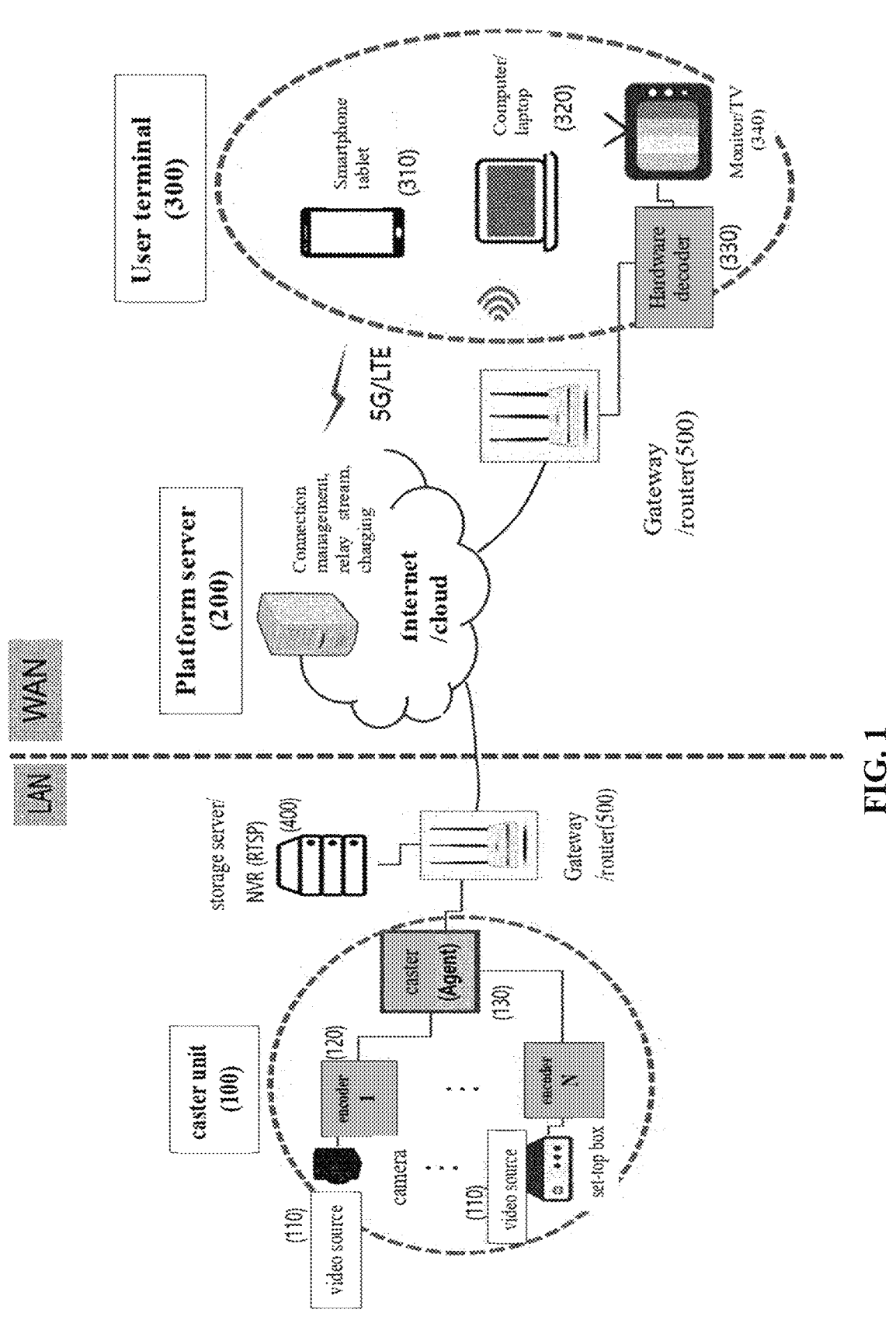
FIG. 1 is a configuration diagram of a platform system for transmitting a video in real time with ultra-low latency according to an embodiment of the present disclosure.

The advantages and features of the present disclosure, and methods of achieving them will be clear by referring to the embodiments that will be describe below in detail with reference to the accompanying drawings. However, the present disclosure is not limited to the exemplary embodiments described hereafter and may be implemented in various ways, the exemplary embodiments are provided to complete the description of the present disclosure and let those skilled in the art completely know the scope of the present disclosure. The present disclosure is defined only by claims.

Throughout the present specification, unless explicitly described otherwise, "comprising" any components will be understood to imply the inclusion of other components rather than the exclusion of any other components.

Terms "~er", etc. used herein mean the units for processing at least one function or operation and may be implemented by hardware, software, or a combination of hardware and software.

Further, in accordance with various embodiments, one "unit" may be implemented as one physical·logical part, a plurality of "units" may be implemented as one physical·logical part, or one "unit" may be implemented as a plurality of physical·logical parts.

Like reference numerals indicate the same components throughout the specification.

Hereafter, a platform system and method for transmitting a video in real time with ultra-low latency according to an embodiment of the present disclosure is described in detail with reference to the accompanying drawings.

It may be understood that combinations of the blocks in processing flowcharts and combinations of processing flowcharts may be performed by computer program instructions.

The computer program instructions may be mounted on a processor of a common computer, a special computer, or programmable data processing equipment, so the instructions that are performed by the processor of a computer or other programmable data processing equipment create parts that perform the functions described in the flowchart block(s).

The computer program instructions may be stored in a computer-usable or computer-readable memory that can be oriented to a computer or other programmable data processing equipment to implement functions in specific ways, so the instructions stored in the computer-usable or computer-readable memory may also produce manufacturing items including instruction means performing the functions described in flowchart block(s).

The computer program instructions may also be mounted on a computer or other programmable data processing equipment, a series of operations are performed on the computer or other programmable data processing equipment and create processes that are executed in the computer and the instructions that perform the computer or other programmable data processing equipment may provide operations for executing the functions described in flowchart block(s).

Further, each block(s) may show a part of a module, a segment, or a code including one or more executable instructions for executing specific logical function(s). Further, it should be noted that the functions stated in block(s) do not follow the order in some substitutive example embodiments. For example, two sequential blocks may be substantially simultaneously performed or may be performed in the reverse order in some cases, depending on corresponding functions.

First, FIG. 1 is a configuration diagram of a platform system for transmitting a video in real time with ultra-low latency according to an embodiment of the present disclosure.

Referring to FIG. 1, a platform system for transmitting a video in real time with ultra-low latency of the present disclosure includes a caster unit 100, a platform server 200, and a user terminal 300.

The caster unit 100 includes a video source 110, an encoder, 120, and a caster (agent) 130 and transmits a video signal encoded by the encoder 120 to the platform server 200 through a network communication network.

In this configuration, the video source 110, which is a device such as one or a plurality of intelligent CCTV, IP cameras, camcorders, set-top boxes, smartphones, drones, and PCs, is a device that can obtain a video signal (video content) corresponding to photographing by photographing an object or a background in accordance with operation by a user or predefined setting.

The encoder 120 also includes one or a plurality of encoders and encodes a video signal (video content), which is input from the each of video sources 110, at a high speed and transmits the video signal to the caster 130.

Even though not a full frame, but a partial frame (sub-frame) of sub-slice type is input for a video signal that is input from the video source 110, the encoder 120 of the present disclosure immediately encodes and transmits the video signal to the caster 130 without waiting the other frames. Accordingly, the frame standby time decreases, whereby ultra-low latency transmission becomes possible.

Further, the encoder 120 is linked with the user terminal 300 and adjusts encoding parameter values with reference to feedback information about the reception state of a video signal received from the user terminal 300, and encodes and transmits the next video signal in real time.

In this case, the feedback information relates to a Quality of Service (QoS) of a video and may include any one of network communication network state information, an available bandwidth of data, a data loss rate, a video quality, and whether there is disconnection. Further, the encoding parameter values may include any one of a compression quantum value, a bitrate, the size of a sub-frame to be encoded, a frame per second (fps), multicast, and the value of a group of pictures (GoP).

Since the encoder 120 and the user terminal 300 transmit and receive real-time feedback information about a video signal in linkage with each other, as described above, QoS of a video can be secured, so there is no need for a specific procedure for securing and controlling QoS of a video and ultra-low latency transmission becomes more possible.

Further, for ultra-low latency transmission of a video signal, each video source 110 may be provided with an encoder 120, thereby being able to individually performing an encoding function. Of course, the encoder 120 may be disposed in the video source 110 in an integrated type.

In order that many users can see a video signal of the same (one) encoder 120, it is possible to copy the video signal from the caster 130 or the platform server 200 and transmit the video signal to many user terminals 300.

Meanwhile, the caster 130, which is a device that streams a video signal encoded by one or a plurality of encoders 120 to the platform server 200 or the user terminal 300, and, depending on cases, additionally transmits the video signal to the storage server 400, can monitor the state of the encoder 120 connected thereto and set and adjust network setting values (an IP address, a port number, etc.) and encoding parameter values such as the size of a sub-frame to be encoded, a bitrate, a compression quantum value, a frame per second (fps), and the value of a group of pictures (GoP). Of course, the caster 130 may include one or a plurality of casters.

The caster 130 transmits the video signal encoded by the encoder 120 in a Peer-to-Peer (P2P) manner when directly transmitting the video signal to the user terminal 300 through a network communication network in accordance with the service policy about a user account 30, transmits the video signal in a relay stream manner when transmitting the video signal to the platform server 200, and can transmit the video signal while selecting any one of the two manners as a path.

When selecting the transmission paths, it is possible to primarily attempt the P2P transmission manner for a stream request from a user accessing the video source 110 and secondarily perform relay transmission through the platform server 200 when P2P transmission is not smooth.

Further, the caster 130 can perform a charging function for the user account 30 in linkage with the platform server 200.

The caster 130 may be separately installed, may be disposed in the encoder 120 in an integrated type with the encoder, and may be provided in an integrated type by being integrated with the video source 110 and the encoder 120.

One or a plurality of encoders 120 may be connected and registered to the caster 130. Further, the caster 130 can perform also the function of a gateway/router in network communication.

Meanwhile, the platform server 200, which is for providing various signals (e.g., contents such as a picture, a video, and an application) in a streaming manner to the user terminal 300, can receive and manage a video signal from the caster 300 and provide a streaming service of a video signal to many user terminals 300 through a network communication network.

In order that many user terminals can see a video signal of the same (one) encoder 120, the caster unit 100 can copy a video signal from the caster 130 or the platform server 200 and transmit the video signal to many user terminals 300.

Figure 2:
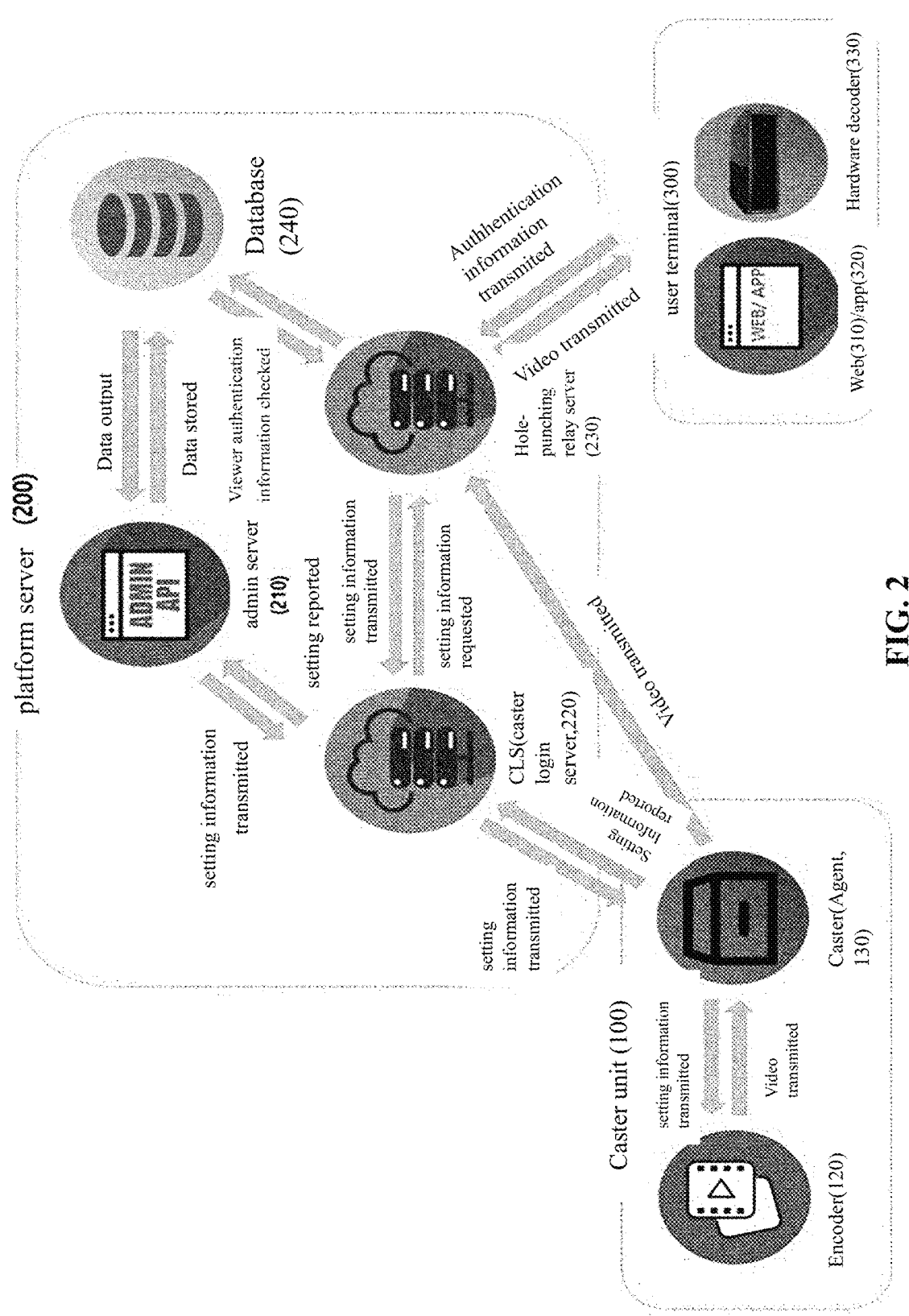
FIG. 2 is a configuration diagram of a platform server 200 for transmitting a video in real time with ultra-low latency according to an embodiment of the present disclosure.

FIG. 2 is a configuration diagram of a platform server 200 for transmitting a video in real time with ultra-low latency according to an embodiment of the present disclosure.

Referring to FIG. 2, the platform server 200 for transmitting a video in real time with ultra-low latency of the present disclosure includes an admin server, a Caster Login Sever (CLS) 220, a hole-punching relay server 230, and a database (DB) 240.

The admin server 210 manages, in the video transmission platform system, a caster device, an operator account, an encoder device, and a user account, receives a setting report about the devices and the accounts from the CLS 220, stores the setting report in the database 240, and takes out and transmits the stored setting information from the database 240 to the CLS 220.

The CLS 220 receives a report on information about video signal setting and state from the caster 130, reports the information to the admin server 210, requests and receives setting information about authentication information, etc. for the user terminal 300 from the hole-punching relay serve 230, and transmits the setting information to the caster 130.

The hole-punching relay server 230 transmits a video signal transmitted from the caster 130 to the user terminal 300, and for this purpose, requests and checks viewer authentication information from the database 240.

The database 240 stores and outputs data transmitted from the admin server 210 and requests and checks the viewer authentication information from the hole-punching relay server 230.

The platform server 200 performs a streaming function connecting transmission and reception of a video signal between the caster 130 and the user terminal 300, performs the function of managing an accessing user account 30, and can perform a multimedia transcoding function too.

Further, the platform server 200 can relay a video signal transmitted from the caster 130 to the user terminal 300 or can inform the encoder 120 or the caster 130 of the network address (IP address) of the user terminal 300 so that a video signal is directly sent to the user terminal 300 even not via itself. In the latter case, the platform server 200 serves to manage a session.

The platform server 200 may receive information for charging from the caster 130 and the user terminal 300 and charge each user account 30.

Meanwhile, the network communication network may be not only an IP-based wired communication network such as the internet, but various wireless communication networks such as mobile communication network including an LTE network and a WCDMA network, and a Wi-Fi network, and a combination thereof. In the present disclosure, though not shown in the figures, the network communication network may include an access network and a backbone network.

The user terminal 300 is a user device that can perform transmission and reception through a network communication network according to a request from the user account 30. The user terminal 300 can perform voice or data communication and can request and receive a streaming service of a video signal from the platform server 200 through the network communication network.

In this case, the user terminal 300 can receive an encoded video signal from the platform server 200 and can perform a process of decoding and playing the encoded video signal.

To this end, the user terminal 300 checks a streaming service request for a specific video signal from a specific user. A streaming service request for a specific video source may be achieved by inputting a Uniform Resource Locator (URL), etc. for requesting a specific video signal from a user through a web browser, etc.

Then, the user terminal 300 accesses the platform server 200 through a Domain Name Server (DNS) and obtains address information (IP address) of the platform server 200 that provides a streaming service for the video signal. Thereafter, the user terminal 300 can receive and use the video signal in a streaming manner from the platform server 200.

The user terminal 300 decodes and outputs the video signal received through the network communication network. It is possible to directly receive the video signal by installing an exclusive hardware decoder 330 for the present disclosure or to receive and decode the video signal by installing a web browser (WEB) 320 and through a software application (Android, iOS) 310.

The user terminal 300 transmits stream reception state information to the encoder 120 in real time to be able to receive a video in an ultra-low latency manner without delay.

The encoder 120 encodes and transmits the next video signal in real time with reference to this respect. In this case, feedback information about a video signal reception state, etc. that is transmitted to the encoder 120 from the user terminal 300 was described above in relation to the encoder 120. In short, the encoder 120 and the user terminal 300 transmit and receive feedback information to and from each other in real time in linkage with each other, thereby enabling ultra latency.

Meanwhile, not only mobile terminals such as a smartphone, a tablet PC, a Personal Digital Assistants (PDA), and a Portable Multimedia Player (PMP), but fixed terminals such as a TV (Smart TV) and a desktop or an exclusive hardware decoder 330 can be used as the user terminal 300.

According to the configuration of the peculiar platform system for transmitting a video in real time with ultra-low latency of the present disclosure described above, it is possible to transmit video signals in real time anytime anywhere as long as the internet is connected, whereby it is possible to provide an ultra-low latency video service even in the fields in which it is required to perform communicating and instructing in real time while remotely seeing a work site.

Figure 3:
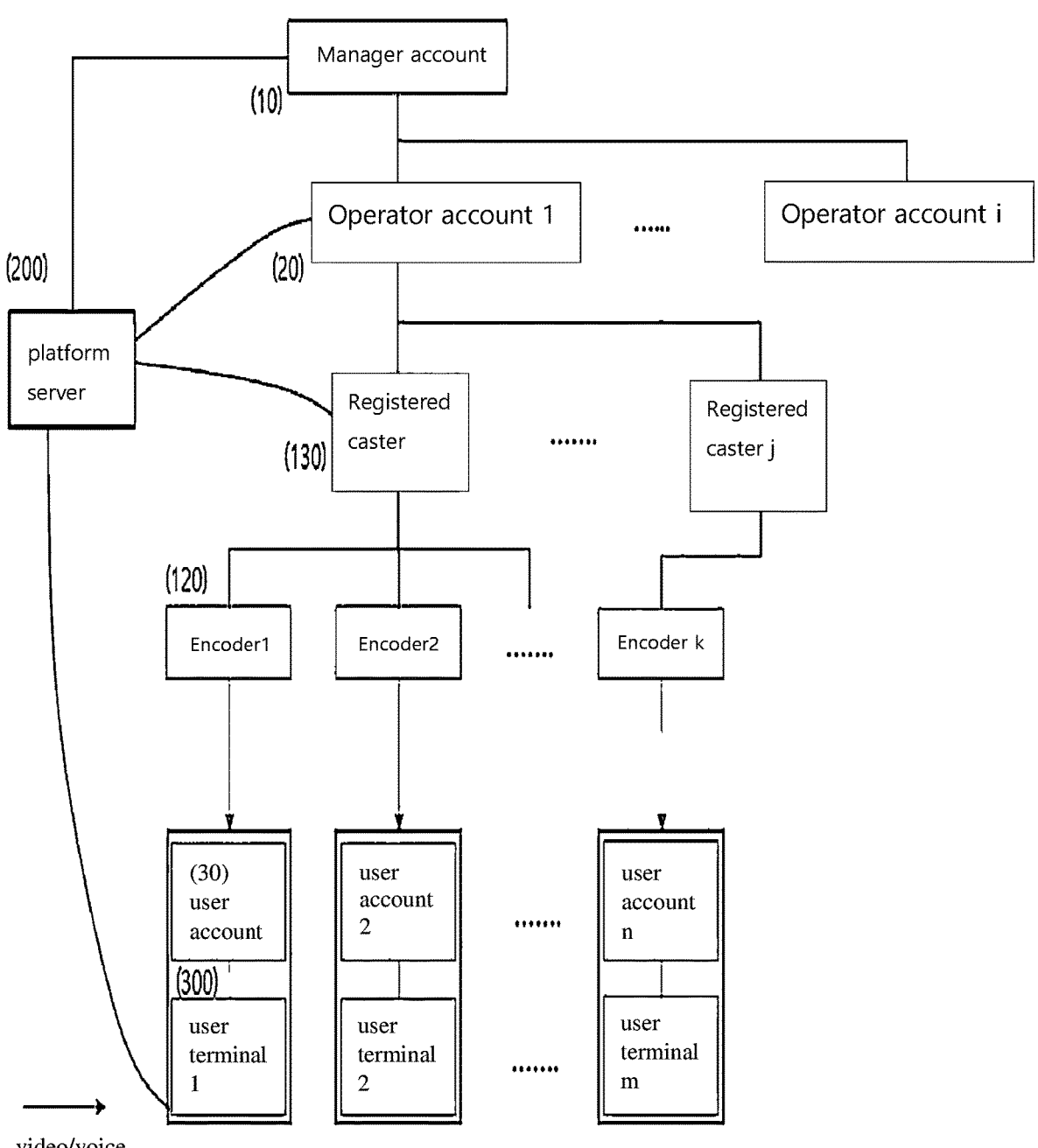
FIG. 3 is a diagram showing a charging operation system of the platform system for transmitting a video in real time with ultra-low latency according to an embodiment of the present disclosure.

Further, a charging operating system for ultra-low latency video transmission according to an embodiment of the present disclosure is described with reference to FIG. 3.

First, a user-charging operating system includes a manager account 10, an operator account 20, and a user account 30.

The manager has the right to be able to manage the entire platform system and register, delete, and cancel the operator, the caster, the encoder, and users on and from the platform.

The operator has the right to register the caster 120, the encoder 120, and the user account and connect the user account 30 to the encoder 120. Further, the operator can be granted a right from the manager and can register, delete, and release a caster, an encoder, and a user on and from the platform server 200.

The user can see only the video source 110 connected to the encoder 120 connected by the operator.

The platform server 200 can perform a user charging function for provision of a video signal in linkage with a registered user account 30 and the caster 130 and can receive information for charging from the caster 200 and the user terminal 300.

The operator account can register one or a plurality of casters 130 as agents. When one caster 130 registers and manages several encoders 120, charging can be performed in accordance with the number of video signal sources.

Figure 4:
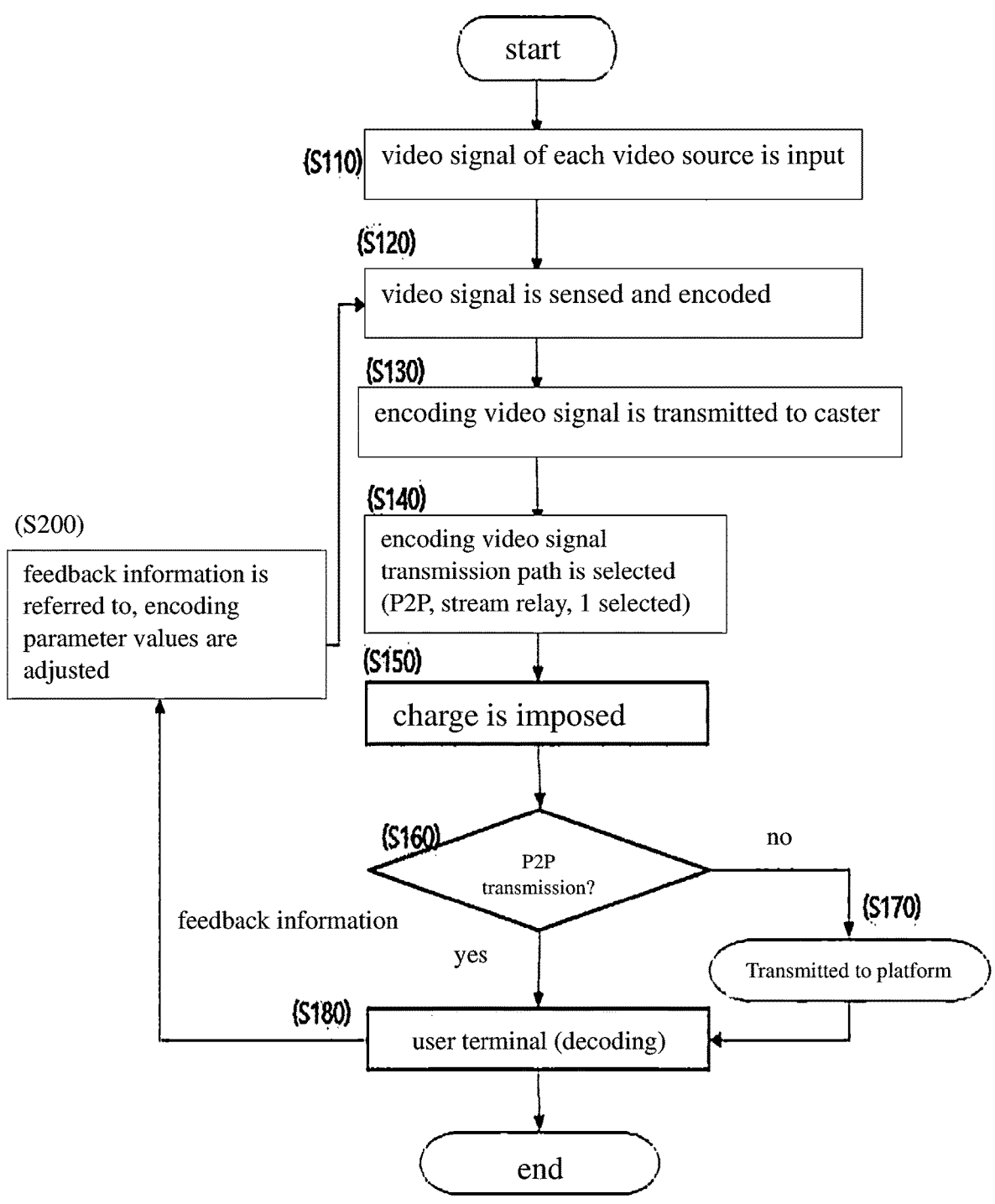
FIG. 4 is a flowchart showing a method for transmitting a video in real time with ultra-low latency according to an embodiment of the present disclosure.

Meanwhile, a method for transmitting a video in real time with ultra-low latency according to an embodiment of the present disclosure is described with reference to the flow-chart of FIG. 4.

First, an encoder 120 can be provided separately from each video source 110 and can receive a video signal to independently perform it function (S110). The encoder 120 senses and encodes a video signal input from one or each of a plurality of video sources 110 (S120) and transmits the encoded video signal to the caster (S130).

In this case, even though a video signal input from each video source is not a full frame, but a partial frame (sub-frame) of sub-slice type, the encoder 120 can encode and transmit the video signal to the caster 130.

Meanwhile, the encoder 120 can adjust encoding parameter values (a compression quantum value, a bitrate, the size of a sub-frame to be encoded, a frame per second (fps), multicast, the value of a group of pictures (GoP), etc.) with reference to feedback information about the reception state of a video signal received in real time in linkage with the user terminal 300 (network communication network state information, an available bandwidth of data, a data loss rate, a video quality, whether there is disconnection, etc.), and can encode the next video signal (S200).

The caster 130 can directly transmit the video signal encoded by the encoder 120 to the user terminal 300 through a network communication network in a Peer-to-Peer (P2P) manner in accordance with the service policy about a user account, or can transmit the video signal to the platform server 200 in a video signal stream relay manner, or can select any one of the two manners as a path (S140).

The caster 130 can charge the user account 30 or the operator account for a video service in linkage with the platform server 200 (S150).

The user terminal 300 directly receives a video signal from the caster 130 in a P2P manner (S160) or receives a video signal relayed through the platform server 120 in a stream relay manner (S170), and decodes the video signal, and outputs the decoded video signal (S180).

In this case, the user terminal can feed back feedback information about the received video signal stream (network communication network state information, an available bandwidth of data, a data loss rate, a video quality, whether there is disconnection, etc.) to the encoder 120 (S200).

The caster 130 may store the video signal encoded by the encoder 120 in the storage server 400 or the platform server 200.

According to the peculiar method for transmitting a video in real time with ultra-low latency of the present disclosure described above, it is possible to transmit video signals in real time anytime anywhere as long as the internet is connected.

The embodiments of the present disclosure described above may be written as programs that can be executed in a computer and may be implemented in a common digital computer that executes the programs using a computer-readable recording medium.

The computer-readable recording medium includes storage media such as a magnetic storage medium (e.g., a ROM, a floppy disk, hard disk, etc.), an optical reading medium (e.g., a CD-ROM, a DVD, etc.), and a carrier wave (e.g., transmission through the internet).

Preferred embodiments were described above to explain the present disclosure. It would be understood by those skilled in the art that the present disclosure may be freely modified without departing from the scope of the present disclosure. Therefore, the disclosed embodiments should be considered in terms of explaining, not limiting. The scope of the present disclosure is not shown in the above description, but claims, and all differences within an equivalent range should be construed as being included in the present disclosure.

This work was supported by the Industrial Technology Innovation Programs—'Electronic component industry technology development project' (20023688, Development and Demonstration of Quality Management System for the Manufacturing Process of Electronic Components Based on Real-Time High-Resolution Video Transmission Technology), and 'Commercialization-linked technology development project' (P0014054, Development of ultra-low-latency video transmission and control system for 5G video network service), both of which are funded By the Ministry of Trade, Industry & Energy (MOTIE, Korea).

The invention claimed is:

1. A platform system for transmitting a video in real time with ultra-low latency, the platform system comprising:
  a video source configured to receive a video signal;
  an encoder configured to compress the video signal provided from the video source; and
  a caster configured to stream the video signal encoded by the encoder through a communication network to a platform server or a user terminal or configured to transmit the encoded video signal to a storage server;
  the platform server configured to provide the encoded video signal transmitted from the caster in a streaming manner; and
  the user terminal configured to be provided with the encoded video signal from the platform server in a streaming manner,
  wherein the user terminal decodes the encoded video signal to provide a decoded video signal;
  wherein the encoder is linked with the user terminal, and adjusts encoding parameter values with reference to feedback information about a reception state of the decoded video signal received from the user terminal in real time and encodes a next video signal from the video source, wherein the feedback information includes at least network communication network state information, an available bandwidth of data, a data loss rate, a video quality, and whether there is disconnection, and wherein the parameter values include a compression quantum value, a bitrate, a size of a sub-frame to be encoded, a frame per second (fps), multicast, and a value of a group of pictures (GoP).

2. The platform system of claim 1, wherein even though the video signal that is input from the video source is not a full frame, but a partial frame (sub-frame) of sub-slice type, the encoder encodes and transmits the video signal to the caster without waiting the other frames.

3. The platform system of claim 1, wherein the encoder is provided for each video source to independently perform an encoding function.

4. The platform system of claim 1, wherein in order that many users can see the video signal of a same encoder, the platform system copies the encoded video signal from the caster or the platform server and transmits the encoded video signal to many user terminals.

5. The platform system of claim 1, wherein the caster transmits the encoded video signal encoded by the encoder in a Peer-to-Peer (P2P) manner when directly transmitting the encoded video signal to the user terminal through the communication network in accordance with a service policy about a user account, transmits the encoded video signal in a relay stream manner when transmitting the encoded video signal to the platform server, and transmits the encoded video signal while selecting any one of the two manners as a path.

6. The platform system of claim 5, wherein when selecting the transmission paths, the platform system primarily attempts the P2P transmission manner for a stream request from the user terminal accessing the video source and secondarily performs relay stream transmission through the platform server when P2P transmission is not smooth.

7. The platform system of claim 1, wherein the caster performs a charging function for a user account in linkage with the user terminal and receives information for charging a user from the platform server.

8. The platform system of claim 7, wherein an operating system for charging the user includes a manager account, an operator account, and a user account, a manager has a right to be able to manage the entire platform system and register, delete, and release an operator, the caster, the encoder, and the user on and from the platform system, the operation has a right to register the caster, the encoder, and the user account and connect the user account to the encoder, and the user can see only the video source of the encoder connected by the operator.

9. The platform system of claim 1, wherein the platform server functions as a streaming device connecting transmission and reception of the video signal between the caster and the user terminal, performs a function of managing and accessing the user account, and performs a multimedia transcoding function.

10. The platform system of claim 1, wherein the platform server (200) serves to relay-stream the encoded video signal transmitted from the caster to the user terminal or informs the encoder or the caster of a network address (IP address) of the user terminal so that the encoded video signal is directly transmitted to the user terminal even not via itself.

11. The platform system of claim 1, wherein the platform server includes:

an admin server configured to manage the caster, an operator account, the encoder, and a user account, receive a setting report about the caster and encoder and the accounts from a Caster Login Server (CLS), store the setting report in a database, and retrieve and transmit the stored setting information from the database to the CLS;

the CLS configured to receive a report on information about video signal setting and state from the caster, report the information to the admin server, request and receive setting information about authentication information for the user terminal from a hole-punching relay server, and transmit the setting information to the caster;

the hole-punching relay server configured to transmit the video signal transmitted from the caster to the user terminal, and for this purpose, request and check viewer authentication information from the database; and the database configured to store and output data transmitted from the admin server and request and check the viewer authentication information from the hole-punching relay server.

12. A method for transmitting a video in real time with ultra-low latency, the method comprising:

receiving a video signal input from one or a plurality of video sources;

sensing and encoding the input video signal by means of an encoder;

transmitting the encoded video signal to a caster;

selecting a transmission path for the encoded video signal; and transmitting the encoded video signal to a user terminal through the selected transmission path, wherein the transmitting of the encoded video signal to the caster includes adjusting encoding parameter values with reference to feedback information about a reception state of a video signal received from the user terminal in real time and then encoding and transmitting a next video signal by means of the encoder linked with the user terminal; and the selecting of a transmission path for the encoded video signal includes transmitting the video signal in a Peer-to-Peer (P2P) manner when directly transmitting the video signal to the user terminal through a network communication network in accordance with a service policy about a user account, transmitting the video signal in a video signal stream relay manner when transmitting the video signal to a platform server, and transmitting the video signal while selecting any one of the two manners as a path, wherein the feedback information includes at least network communication network state information, an available bandwidth of data, a data loss rate, a video quality, and whether there is disconnection, and wherein the parameter values include a compression quantum value, a bitrate, a size of a sub-frame to be encoded, a frame per second (fps), multicast, and a value of a group of pictures (GoP).

13. The method of claim 12, wherein the transmitting of the encoded video signal to the caster further includes encoding and transmitting the video signal to the caster without waiting the other frames even though the video signal provided from the video source is not a full frame, but a partial frame (sub-frame) of sub-slice type.

14. The method of claim 12, further comprising charging a user account or an operator account for a video service by means of the caster in linkage with the platform server.

15. The method of claim 12, further comprising storing the video signal encoded by the encoder in a storage server or the platform server by the caster.

* * * * *